(12) United States Patent
Fowler, Jr. et al.

(10) Patent No.: US 6,209,398 B1
(45) Date of Patent: Apr. 3, 2001

(54) FLUID PRESSURE TRANSDUCER APPARATUS AND METHOD FOR ASSEMBLING

(75) Inventors: John R. Fowler, Jr., Nicholasville; James L. Tomlinson, Versailles; Gerald F. Davis, Lexington, all of KY (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/156,103

(22) Filed: Sep. 17, 1998

(51) Int. Cl.$^7$ ..................................................... G01L 9/12
(52) U.S. Cl. ............................................... 73/724; 73/718
(58) Field of Search ............................. 73/756, 724, 718, 73/727, 726, 721, 720

(56) References Cited

U.S. PATENT DOCUMENTS

| | | | |
|---|---|---|---|
| 5,763,787 | * | 6/1998 | Gravel et al. ....................... 73/720 X |
| 5,920,015 | * | 7/1999 | Hallberg et al. ........................ 73/724 |

* cited by examiner

*Primary Examiner*—Joseph L. Felber
(74) *Attorney, Agent, or Firm*—Russell E. Baumann; Frederick J. Telecky, Jr.

(57) ABSTRACT

A fluid pressure transducer assembly (10) includes an exemplary silicon or ceramic capacitive transducer (22) having a relatively flexible diaphragm portion (22e) mounted on a ceramic substrate or circuit board (18) over a bore (18a) so that the diaphragm is exposed to fluid pressure from a port (12m) received through the bore. The circuit board is received in a plastic housing (12) laterally positioned by guides (12e, 12f) on three height control pins (12d) to vertically position the circuit board a defined, precise distance above a platform (12b) on which a bead of adhesive sealing material has previously been placed, the sealing material having a height greater than the distance between a plane in which the free end of the height control pins lie and a plane in which the top surface of the platform lies. As a result, the circuit board is sealed to the plastic housing through a bead having a uniform, precise height all around its circumference to isolate temperature expansion stresses. According to another feature of the invention an electrically conductive layer (30a) is formed on the top surface of the circuit board beneath the transducer (22) and another electrically conductive layer (30b) is formed on the top surface of the transducer (22) electrically joined together to form an EMI shield.

12 Claims, 2 Drawing Sheets

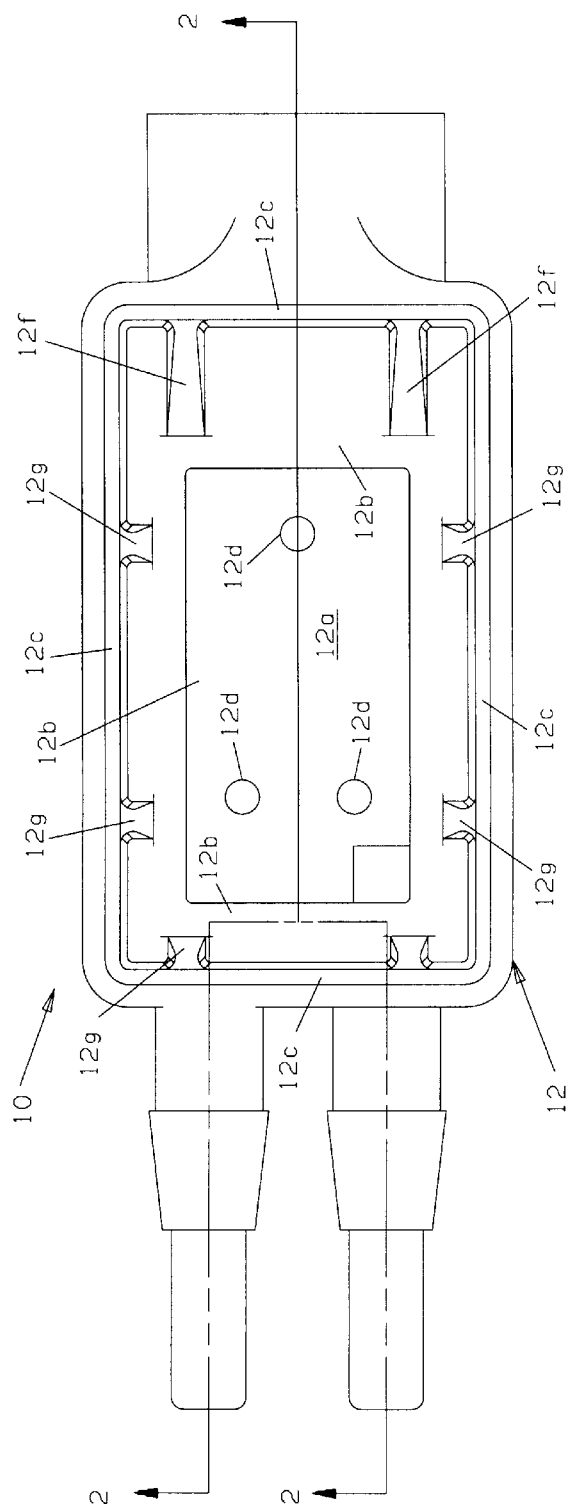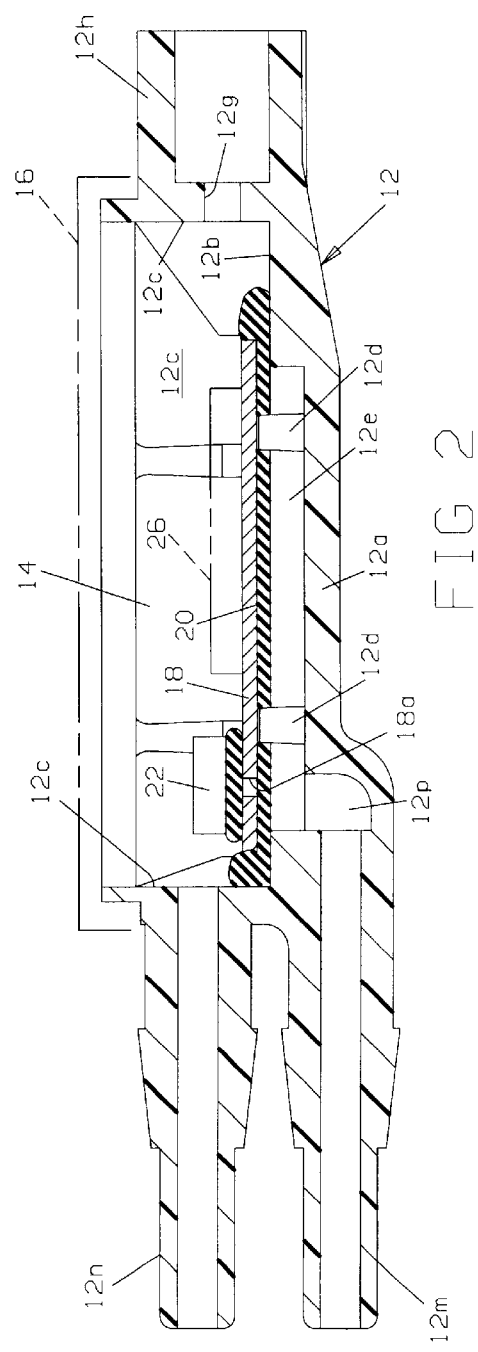

FLUID PRESSURE TRANSDUCER APPARATUS AND METHOD FOR ASSEMBLING

FIELD OF THE INVENTION

This invention relates generally to fluid pressure transducers and packaging therefor and more particularly to low pressure sensing transducers and to transducers adapted for use in environments containing electromagnetic radiation such as in automotive, industrial and wireless communication environments.

BACKGROUND OF THE INVENTION

Pressure transducers of the type which comprise a thin, relatively flexible diaphragm portion of suitable material, such as silicon or ceramic, on which either a selected resistive element or a capacitive plate is printed whereby exposure to a fluid pressure source causes deflection of the diaphragm will cause a change in the resistive value of the resistive element or a change in the spacing of the capacitive plate with a mating capacitive plate and concomitantly a change in capacitance are well known in the art.

When used as a low pressure sensor, economical packaging of the transducer in a housing so that an effective seal is obtained while at the same time preventing stress related to the mounting and sealing of the transducer from influencing the output becomes problematic. This is caused, at least in part, by the significant difference in thermal expansion between the material used to form the transducer, e.g., silicon, ceramic or the like, and the housing of plastic or the like. A conventional sealing arrangement involves placement of a ring of sealing material around an inlet pressure port in a housing and mounting the transducer so that the pressure sensitive diaphragm is precisely aligned with the pressure port. This conventional arrangement not only involves stress isolation issues, it also limits flexibility in design choices in defining the location of the transducer within the package.

Another problem involved with liquid pressure transducer designs whether for use in monitoring high or low fluid pressure sources relates to their use in environments, such as automotive, industrial and communication, which contain electromagnetic radiation which cause interference (EMI) with the transducer signal. Typically, an outer electrically conductive metallic housing electrically tied to ground is used in which to mount the transducer package in order to shield the assembly from such EMI. This approach, however, not only adds to the expense of the product by adding to the part count of the assembly but it is also cumbersome and adds to the physical size of the package which is undesirable since such transducers are typically located in areas in which space is at a premium.

SUMMARY OF THE INVENTION

An object of the present invention is to provide an apparatus and a method which overcome the above noted prior art limitations. Another object of the invention is to provide a fluid pressure transducer particularly suitable for use with relatively low pressure levels which is inexpensive to manufacture yet has improved yield and reliability. Yet another object of the invention is to provide a pressure transducer having improved means for isolating the transducer from EMI.

Briefly stated, a fluid pressure transducer made in accordance with a first feature of the invention comprises a housing formed of suitable material such as plastic having a cavity defined by a bottom wall circumscribed by a raised seating platform, the top surface of which lies in a first plane, and enclosing sidewalls extending upwardly from the platform. A plurality of height control pins extend upwardly from the bottom wall to a position which lie in a second plane spaced above the first plane by a specific, defined dimension or gap. A bead of flexible adhesive sealing material, such as RTV, is placed on the platform circumscribing the bottom wall and extending to some height above the second plane. A fluid pressure transducer formed of silicon, ceramic or the like and having a diaphragm formed in the bottom surface thereof spaced inwardly of the outer perimeter of the transducer is mounted on a circuit board formed of ceramic or other suitable material and sealed thereto by a bead of suitable sealant material, such as RTV, around the outer perimeter of the transducer. A suitable bore is formed through the circuit board at any desired location with the transducer aligned with the bore so that the diaphragm of the transducer is exposed to fluid pressure received through the bore. The circuit board is configured and sized to be received on the platform and to completely enclose the bottom wall of the housing. The circuit board is placed on the adhesive sealing bead on the platform prior to curing of the bead material and pressed downwardly into engagement with the height control pins so that a pressure seal comprising a bead of uniform, controlled height is formed all around the periphery of the circuit board. A first pressure port is formed in the bottom wall of the housing at any convenient location on one side of the circuit board and a second pressure port may be formed in the sidewall of the housing at any convenient location at a height above the location of the sealing bead on the other side of the circuit board.

The provision of the height control pins used in conjunction with the platform to form a sealing bead of uniform height greatly facilitates automated assembly as well as providing complete flexibility in locating the transducer at any desired location of the circuit board.

According to another feature of the invention, the top surface of the circuit board on which the transducer is received, as well as the top surface of the transducer body itself, are metallized to form EMI shielding surfaces. These surfaces are electrically connected together by means of suitable wire bond connections with another electrical connection being made from one of the metallized surfaces to a ground. This results in EMI protection without adding to the physical size of the device as well as without adding to the parts count and with minimal effect on cost.

BRIEF DESCRIPTION OF THE DRAWINGS

Other objects, advantages and details of the novel and improved pressure transducer of this invention appear in the following detailed description of preferred embodiments of the invention, the detailed description referring to the drawings in which:

FIG. 1 is a top plan view of a transducer housing with an enclosing top lid removed for purposes of illustration;

FIG. 2 is a cross section taken on lines 2, 2—2 of FIG. 1 and additionally showing a transducer and circuit board mounted in the housing and showing the top lid in phantom lines;

Dimensions of certain of the parts may have been altered for purposes of illustration.

DESCRIPTION OF PREFERRED EMBODIMENTS

Figure 3:
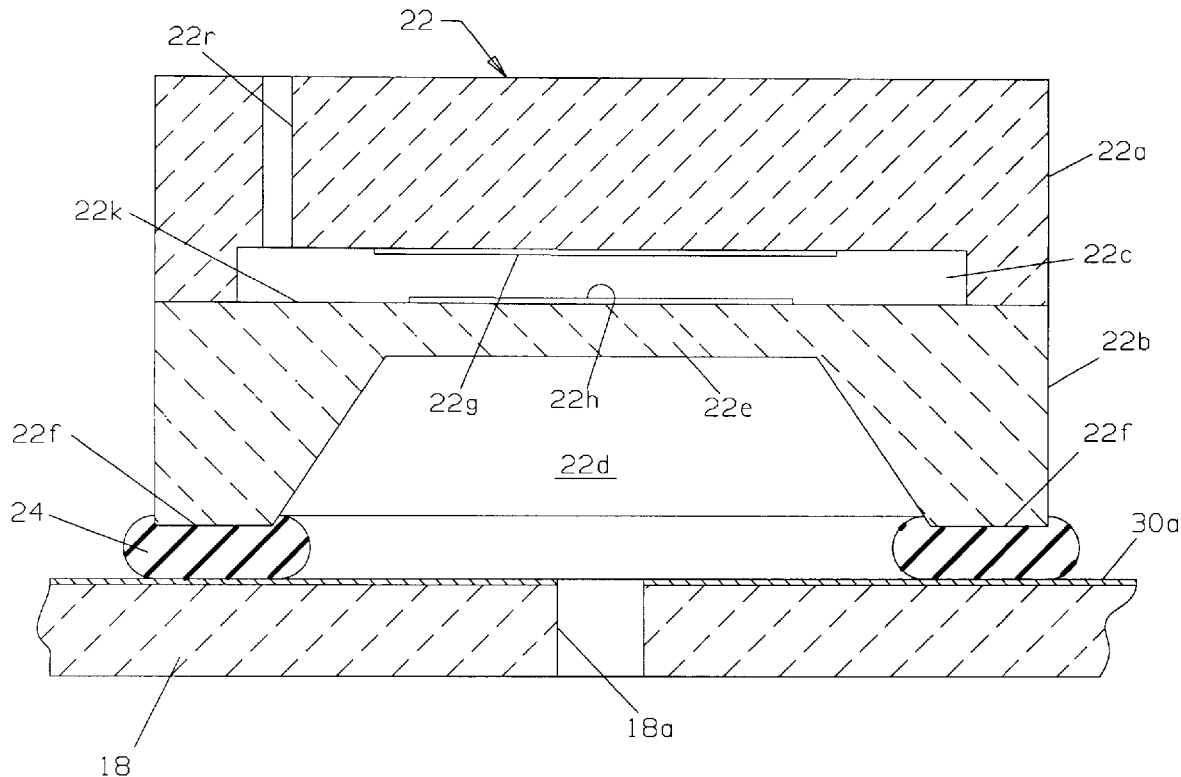
FIG. 3 is an enlarged cross section of the transducer and a portion of the circuit board shown in FIG. 2.

With reference to FIGS. 1–3, a fluid pressure sensing transducer 10 is shown comprising a housing formed of suitable, preferably moldable, plastic material having a bottom wall 12a completely circumscribed by a raised platform 12b, in effect forming a recess or lower cavity 12e in bottom wall 12a. The top surface of platform 12b lies in a first plane. Sidewalls 12c extend upwardly from platform 12b to a free distal end defining an upper cavity 14 therein. A top lid 16, shown in phantom lines, may be used to close the cavity. Three height control pins 12d extend upwardly from bottom wall 12a to a distal free end which lie in a second plane a selected distance above and parallel to the first plane in which the top surface of platform 12b lies for a purpose to be discussed below.

A circuit board 18 of suitable material such as ceramic is received on height control pins 12d with an adhesive sealant 20 of suitable material such as RTV being disposed between the outer perimeter portion of the circuit board and platform 12b. The outer configuration of circuit board 18 matches that of platform 12b and is sized so that the outer perimeter of the board is greater in length and width than that of the length and width of the recess 12e. The plastic material of housing 12 has a significantly greater thermal coefficient of expansion than that of either the ceramic of circuit board 18 or the ceramic or silicon material of transducer 22 mounted on board 18 so that special care is required to deal with stress isolation issues when mounting and sealing the circuit board to the plastic housing. By means of the height control pins and the platform, a seal is obtained which has a uniform, defined gap all around the periphery of the board controlled to a tight tolerance. This is accomplished by placing a bead of flexible, adhesive sealing material having a height greater than the distance between the first and second planes and then placing circuit board 18 onto the bead before the sealing material has cured and depressing the circuit board until it engages the tops of the height control pins 12d and maintaining the board in that position until the sealing material has cured. Tapered guide elements 12f, 12g, extending inwardly from sidewall 12c, are used to guide circuit board 18 to a predetermined central location on platform 12b.

Preferably prior to the installation of circuit board 18 into housing 12, a transducer 22 composed of suitable material, such as silicon or ceramic, is mounted on the circuit board at any suitable location. The board is provided with a bore 18a formed at the selected location so that a relatively flexible diaphragm 22e of the transducer is in fluid pressure receiving relationship with the bore (see FIG. 3). Although various fluid pressure transducers can be employed in the invention including, for example, capacitive and resistive, for purposes of illustrating the invention, a capacitive transducer is shown comprising a rigid upper base portion 22a formed with a recessed area 22c and a lower portion 22b having a central portion recessed at 22d, as by micromachining in the case of silicon, in a known manner, to form a relatively thin, flexible diaphragm portion 22e. The lower peripheral surface 22f serves as an attachment surface for mounting, as shown in FIG. 3. A sealing layer 24 of suitable adhesive material, such as RTV, is used to attach the transducer to the circuit board in fluid sealed relation thereto. Since the thermal coefficient of expansion of the transducer material (silicon, ceramic or the like) is not substantially different from that of the circuit board material (e.g. ceramic), conventional attachment techniques can be employed without creating significant stress issues. Upper base portion 22a is formed with opposed capacitor plates 22g, 22h suitably deposited on the upper surface of recess 22c of base portion 22a within the recess and on the upper surface 22k of lower portion 22b. Suitable electrical traces (not shown) connect the plates and guard rings (not shown) to connection pads 22m, 22n, 22o on the top surface of transducer 22 and shown in FIG. 4 and to be discussed below in relation to another feature of the invention. A second pressure port 22r is formed in base portion 22a in communication with recess 22c although the invention is applicable to sensors in which recess 22c is sealed either with a reference pressure or a partial vacuum. Upper and lower transducer portions 22a, 22b are sealed together in a known manner.

Figure 4:
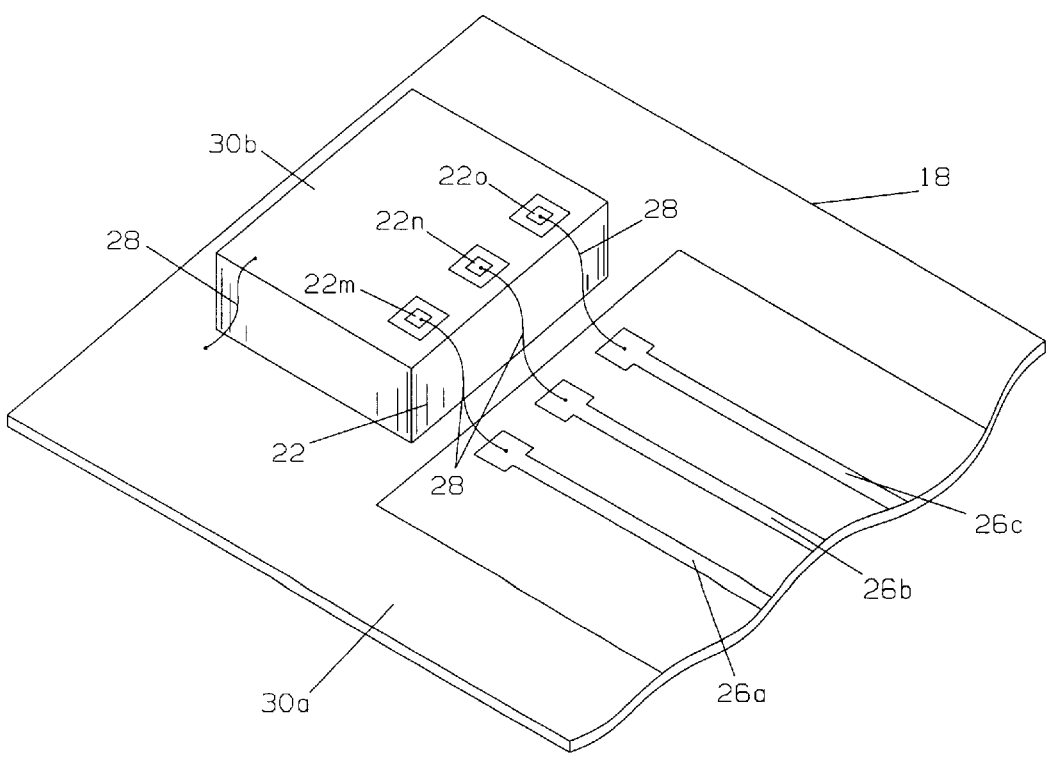
FIG. 4 is a perspective view of the transducer and a portion of the circuit board of FIG. 2.

Typically, circuit board 18 is provided with signal conditioning electronics 26 as indicated by phantom lines 26 in FIG. 2 with pads 22m, 22n and 22o connected to respective traces 26a, 26b and 26c respectively as by use of wires 28 (FIG. 4). Electrical connection between circuit board 18 and suitable control devices and the like (not shown) is made through aperture 12g of sidewall 12c and shroud 12h of the transducer housing.

According to another feature of the invention, the top surface of circuit board 18 is provided with an electrically conductive metal layer 30a placed under transducer 22 and which may, if desired, extend on either side of conditioning circuitry 26, and traces 26a, 26b, 26c as indicated in FIG. 4. Metal layer 30a can be applied by any conventional means as by deposition, screen printing or the like. Another metal layer 30b is provided on the top surface of transducer 22, again by any suitable means such as that used for layer 30a, and is suitably spaced from bonding pads 22m, 22n, 22o to provide appropriate electrical isolation therefrom. Metal layers 30a, 30b are electrically joined together by a wire 28 suitably bonded to both layers. Another suitable connection (not shown) is preferably made from one of layer 30a, 30b to a lead extending out of the transducer housing 12 for attachment to a predetermined voltage such as ground either directly or through a suitable capacitor (not shown). The above described metal layers 30a, 30b provide effective shielding from EMI. In environments such as automotive and many industrial and wireless communication settings such shielding is of increasing importance. In accordance with the invention, the shielding is provided without any significant cost and without adding to the size of the transducer housing. It will be appreciated that the shielding features of the invention can be applied not only to pressure transducers but to virtually any electrical device which is subject to EMI. Although in the described embodiment the electrically conductive layers are shown both on the transducer and the s circuit board, it will be appreciated that one or more layers on a transducer connected to a predetermined voltage will enhance protection of the electrical signal of the transducer from electromagnetic interference.

With respect to the transducer housing, the use of the controlled height feature of the sealing bead between circuit board 18 and platform 12b by means of height control pins 12d permits the sealing material to act as a stress-isolating adhesive which also seals the pressure cavities on either side of the circuit board from each other. Further, the invention results in being able to locate pressure port 12m and its opening 12p into cavity 12e, along with the location of bore 18a in the printed circuit, at any desired location to enhance design flexibility since the seal location with the plastic housing is at the outer perimeter of the circuit board rather than being related to the location of the port. Placement of the sealing bead on the platform is much less critical than it would be in placing such a seal closely adjacent to the port opening and therefore results in a device in which assembly of the device is more conducive to automation including the dispensing and placement of sealant 20.

With respect to the particular pressure transducer 22 shown and described it will be understood that variations in pressure introduced through port couplings 12m, 12n will cause the relatively thin diaphragm portion 22e to flex thereby changing the distance between plates 22g, 22h and concomitantly the capacitance. The capacitance signal is conditioned by conventional electronics 26 to provide an electrical signal corresponding to the pressure differential.

By way of example, the signal conditioning circuitry may be of the type described in U.S. Pat. No. 4,951,236, assigned to the assignee of the present invention and which is incorporated herein by this reference.

Although a capacitive transducer has been described, it will be appreciated that the invention of the stress-isolation features can be utilized with non-capacitive transducers such as a resistive as well.

Pressure transducer apparatus made in accordance with invention can be used in a variety of applications. When used as a differential sensor as shown in the drawings the seal provided by sealant 20 is effective when the first port 12*m* is connected to a high fluid pressure source to be monitored within a range from a low of a couple of inches of water up to approximately 50 psi and when the second pressure source is connected to a low pressure source such as atmospheric. By way of example, in one application with which the apparatus is used, the high pressure source (port m) is approximately 0.2 psi and the low pressure source is atmospheric (port n).

It should be understood that although preferred embodiments of the invention have been described by way of illustrating the invention, this invention includes all modifications and equivalents of the described embodiment falling within the scope of the appended claims.

We claim:

1. A fluid pressure transducer assembly comprising
   a housing having a bottom wall circumscribed by a platform having a top surface positioned above the bottom wall and lying in a first plane and forming a lower cavity, the platform circumscribed by a sidewall extending upwardly to form an upper cavity,
   a plurality of height control pins extending upwardly from the bottom wall to their respective free distal ends lying in a second plane extending parallel to and further removed from the bottom wall than the first plane,
   a circuit board received on the height control pins and extending over the platform on all sides thereof,
   adhesive sealing material received on the top surface of the platform between the circuit board and the top surface of the platform,
   a fluid pressure transducer having a flexible diaphragm portion the transducer sealingly mounted on a selected portion of the circuit board in alignment with a bore formed through the circuit board so that the diaphragm is exposed to fluid pressure received through the bore,
   a fluid pressure port extending into the lower cavity, and
   an aperture formed in the sidewall for passage of electrical signal leads.

2. A fluid pressure transducer assembly according to claim 1 in which the fluid pressure port extends through the bottom wall.

3. A fluid pressure transducer assembly according to claim 1 in which the fluid pressure transducer is capacitive.

4. A fluid pressure transducer assembly according to claim 1 in which there are three height control pins.

5. A fluid pressure transducer assembly according to claim 1 in which the housing is formed of plastic material and the circuit board is formed of ceramic.

6. A fluid pressure transducer assembly according to claim 5 in which the adhesive sealing material is RTV.

7. A fluid pressure transducer assembly according to claim 1 in which the fluid pressure transducer has a top surface and further comprising an electrically conductive layer formed on the top surface of the circuit board beneath the fluid pressure transducer and an electrically conductive layer formed on the top surface of the fluid pressure transducer, the electrically conductive layers electrically connected together to form an EMI shield.

8. A transducer assembly comprising a housing formed of electrically insulative material, circuit board having electrical traces on a top surface thereof mounted within the housing, a transducer mounted on the circuit board and electrically connected to electrical traces on the circuit board, the transducer having top and bottom surfaces, an electrically conductive layer formed on each of the top surface of the circuit board beneath the transducer and on the top surface of the transducer essentially covering the entire top surface of the transducer, the electrically conductive layers being electrically connected together and being adapted for connection to a predetermined voltage for providing protection against electromagnetic interference.

9. A transducer assembly comprising a transducer having a flexible diaphragm member for providing an electrical signal responsive to a selected condition upon deflection of the diaphragm member and having top, bottom and side surface areas, and electrically conductive metal layer formed on at least the top surface area, and a circuit board with an electrically conductive metal laver disposed on a selected area of the circuit board with the transducer member mounted on the selected area, the electrically conductive metal layers being electrically connected together and having an electrical connection for attachment to a predetermined voltage for providing protection of the electrical signal from electromagnetic interference.

10. A transducer assembly according to claim 9 in which the transducer of the transducer assembly includes silicon.

11. A method for packaging a fluid pressure transducer in a housing comprising the steps of
   forming a plastic housing having a bottom wall circumscribed by a platform having a top surface lying in a first plane,
   forming height control pins which extend upwardly from the bottom wall to respective distal free ends lying in a second plane parallel to and spaced above the first plane by a selected, defined distance,
   dispensing a curable adhesive sealing material on the top surface of the platform to a height greater than the distance between the first and second planes,
   mounting a fluid pressure transducer on a circuit board in fluid tight sealed relation over a bore formed through the circuit board and,
   placing the circuit board on the sealing material prior to curing of the sealing material and forcing the circuit board downwardly into engagement with the height control pins so that sealing material is disposed completely around the platform between the top surface of the platform and the circuit board having a precise, uniform height, the sealing material forming a fluid tight seal.

12. A method according to claim 11 in which the circuit board is formed of ceramic and the adhesive sealing material is RTV.

* * * * *

UNITED STATES PATENT AND TRADEMARK OFFICE
CERTIFICATE OF CORRECTION

PATENT NO. : 6,209,398 B1
DATED : April 3, 2001
INVENTOR(S) : John R. Fowler, Jr., James L. Tomlinson, Gerald F. Davis It is certified that error appears in the above-identified patent and that said Letters Patent is hereby corrected as shown below:

<u>Title page,</u>
Item [22], the filing date "September 17, 1998" should be "September 18, 1998".

Signed and Sealed this

Second Day of October, 2001

Attest:

NICHOLAS P. GODICI
Attesting Officer
Acting Director of the United States Patent and Trademark Office